United States Patent
Chuang et al.

(10) Patent No.: US 10,308,319 B1
(45) Date of Patent: Jun. 4, 2019

(54) CONTROL DEVICE WITH ADJUSTABLE COMMUNICATION PERIOD AND METHOD FOR ADJUSTING COMMUNICATION PERIOD

(71) Applicant: TEKTRO TECHNOLOGY CORPORATION, Changhua County (TW)

(72) Inventors: Hsun-Yu Chuang, Changhua County (TW); Pao-Wen Lin, Changhua County (TW)

(73) Assignee: TEKTRO TECHNOLOGY CORPORATION, Changhua County (TW)

( * ) Notice: Subject to any disclaimer, the term of this patent is extended or adjusted under 35 U.S.C. 154(b) by 0 days.

(21) Appl. No.: 15/899,469

(22) Filed: Feb. 20, 2018

(30) Foreign Application Priority Data

Nov. 22, 2017 (TW) .............................. 106140485 A

(51) Int. Cl.
*B62M 25/08* (2006.01)
*F16H 61/02* (2006.01)
*B62M 9/122* (2010.01)
*B62K 23/06* (2006.01)

(52) U.S. Cl.
CPC ............ *B62M 25/08* (2013.01); *B62M 9/122* (2013.01); *F16H 61/0204* (2013.01); *B62K 23/06* (2013.01)

(58) Field of Classification Search
CPC ........ B62M 25/08; B62M 9/122; B62K 23/06
USPC ............................................... 340/12.2–12.25
See application file for complete search history.

(56) References Cited

U.S. PATENT DOCUMENTS

| | | | |
|---|---|---|---|
| 2006/0007011 A1* | 1/2006 | Chivarov | G09F 21/04 340/815.45 |
| 2012/0035011 A1* | 2/2012 | Menachem | B62M 9/122 474/126 |
| 2014/0102237 A1* | 4/2014 | Jordan | B62K 23/02 74/473.12 |
| 2016/0339986 A1* | 11/2016 | Jordan | B62K 23/02 |

* cited by examiner

*Primary Examiner* — Allen T Cao
(74) *Attorney, Agent, or Firm* — Locke Lord LLP; Tim Tingkang Xia, Esq.

(57) ABSTRACT

A control device with adjustable communication period is configured for an electromechanical gear shifter of a bicycle. The control device comprises a master controller and a trigger sensor. The master controller sends a broadcast signal with a first period when the master controller is in a working mode. The master controller sends the broadcast signal with a period selected from an idle period set when the master controller is in an idle mode. The trigger sensor is in communicable connection with a master controller, and the trigger sensor detects a trigger state to send a trigger signal. The master controller switches to the working mode when the master controller receives the trigger signal. The master controller switches to the idle mode selectively when the master controller does not receive the trigger signal.

18 Claims, 4 Drawing Sheets

CONTROL DEVICE WITH ADJUSTABLE COMMUNICATION PERIOD AND METHOD FOR ADJUSTING COMMUNICATION PERIOD

CROSS-REFERENCE TO RELATED APPLICATIONS

This non-provisional application claims priority under 35 U.S.C. § 119(a) on Patent Application No(s). 106140485 filed in Taiwan on Nov. 22, 2017, the entire contents of which are hereby incorporated by reference.

TECHNICAL FIELD

This disclosure relates to a control device with adjustable communication period, and more particularly to the control device installed in an electronic gear-shifting system.

RELATED ART

The electronic gear-shifting system is a milestone in the history of the development of bicycle kits. Compared to the conventional mechanical gear-shifting system with common problems such as gear cable stretching, housing damage, etc., the electronic gear-shifting system can control the motor to rotate at a constant speed so that the gear-shifting operation is stable. The keystroke of the control buttons of controllers installed on the handlebar is fixed and the position of the buttons does not change due to vibration during cycling, so the gear-shifting operation is accurate and fast. The electronic gear-shifting system can also reduce the chain wear as well as be easily maintained, and the performance of gear-shifting does not change over time.

In general, there are two kinds of batteries adapted for electronic gear-shifting systems: the seat post battery and the battery pack. The seat post battery can be hidden in the frame's seat tube or mounted alongside the outer periphery of the seat tube"). One seat post battery can provide power to the front derailleur and the rear derailleur concurrently. On the contrary, the battery pack usually comprises two batteries respectively integrated with the front derailleur and the rear derailleur. However, since the total accommodated space provided by the front and rear derailleurs is smaller than that of the seat tube, the total volume of batteries of the battery pack is usually smaller than the volume of the battery of the seat post battery in the design stage. Accordingly, when a battery pack is adopted, it is necessary to take the battery capacity into consideration because a smaller volume of battery results in a lower capacity of electricity. In the operation of the electronic gear-shifting system, the most power-consuming part lies in the communicable connection established between the MCU (master control unit) and the SCU (slave control unit) for rapid responses. A simple way to conserve power is forcing the MCU and SCU into sleep mode when they are not working, and turning the antenna or the transceiver off as well.

SUMMARY

According to one or more embodiments of this disclosure, a control device with adjustable communication period for an electromechanical gear shifter of a bicycle, comprising: a master controller comprising a working mode and an idle mode, wherein the master controller sends a broadcast signal with a first period when the master controller is in the working mode, and the master controller sends the broadcast signal with a period selected from an idle period set when the master controller is in the idle mode, wherein the idle period set comprises a second period at least and the second period is greater than the first period; and a trigger sensor electronically connecting to the master controller, wherein the trigger sensor detects a trigger state and sends a trigger signal; wherein the master controller switches to the working mode when the master controller receives the trigger signal, and the master controller selectively switches to the idle mode when the master controller does not receive the trigger signal.

According to one or more embodiments of this disclosure, a method for adjusting the communication period configured for the control device comprising: sending the broadcast signal with the first period when the master controller is in the working mode; keeping in the working mode when the master controller receives the trigger signal after sending the broadcast signal, and switching to the idle mode selectively when the master controller does not receive the trigger signal; sending the broadcast signal with the period selected from the idle period set by the master controller, wherein the idle period set comprises a second period at least and the second period is greater than the first period; and receiving the trigger signal and switching to the working mode by the master controller when the master controller is in the idle mode.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1A:
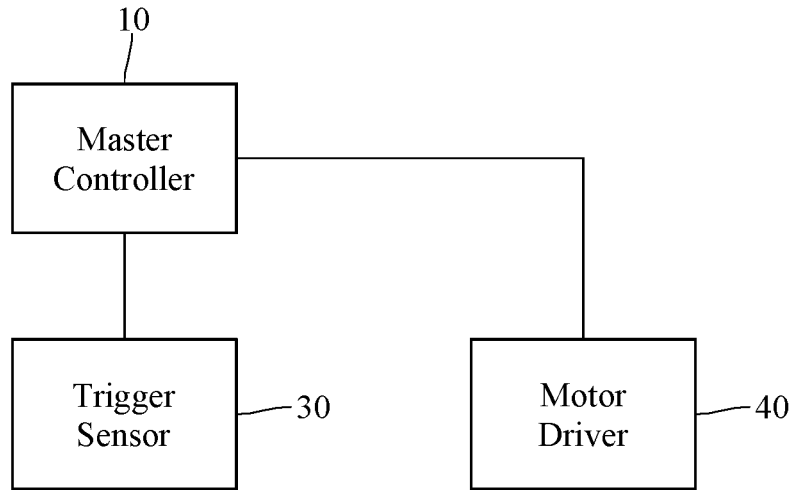
FIG. 1A is a schematic view according to an embodiment of the present disclosure.

Please refer to FIG. 1A. In an embodiment of the present disclosure, a control device with adjustable communication period configured for the electromechanical gear shifter comprises a master controller 10 and a trigger sensor 30 in communicable connection with the master controller 10.

The master controller 10 is configured for sending or receiving a broadcast signal. Practically, the master controller 10 is a microprocessor or a Soc (System on Chip) that integrated with the antenna or the transceiver to send or receive the broadcast signal. Please refer to FIG. 1A. The master controller 10 electronically connects to the motor driver 40. Practically, the motor driver 40 locates in the electromechanical gear shifter. The master controller 10 controls the motor driver 40 according to the broadcast signal with a shift command. The motor driver 40 enables a motor to adjust the derailleur to perform the speed shifting. In another embodiment of the present disclosure, the broadcast signal further comprises the electricity information of the master controller 10 or the gear information of the motor driver 40. The master controller 10 can establish a communicable connection to another controller through the broadcast signal. As set forth above, the present of disclosure does not limit the content of the broadcast signal.

Figure 2:
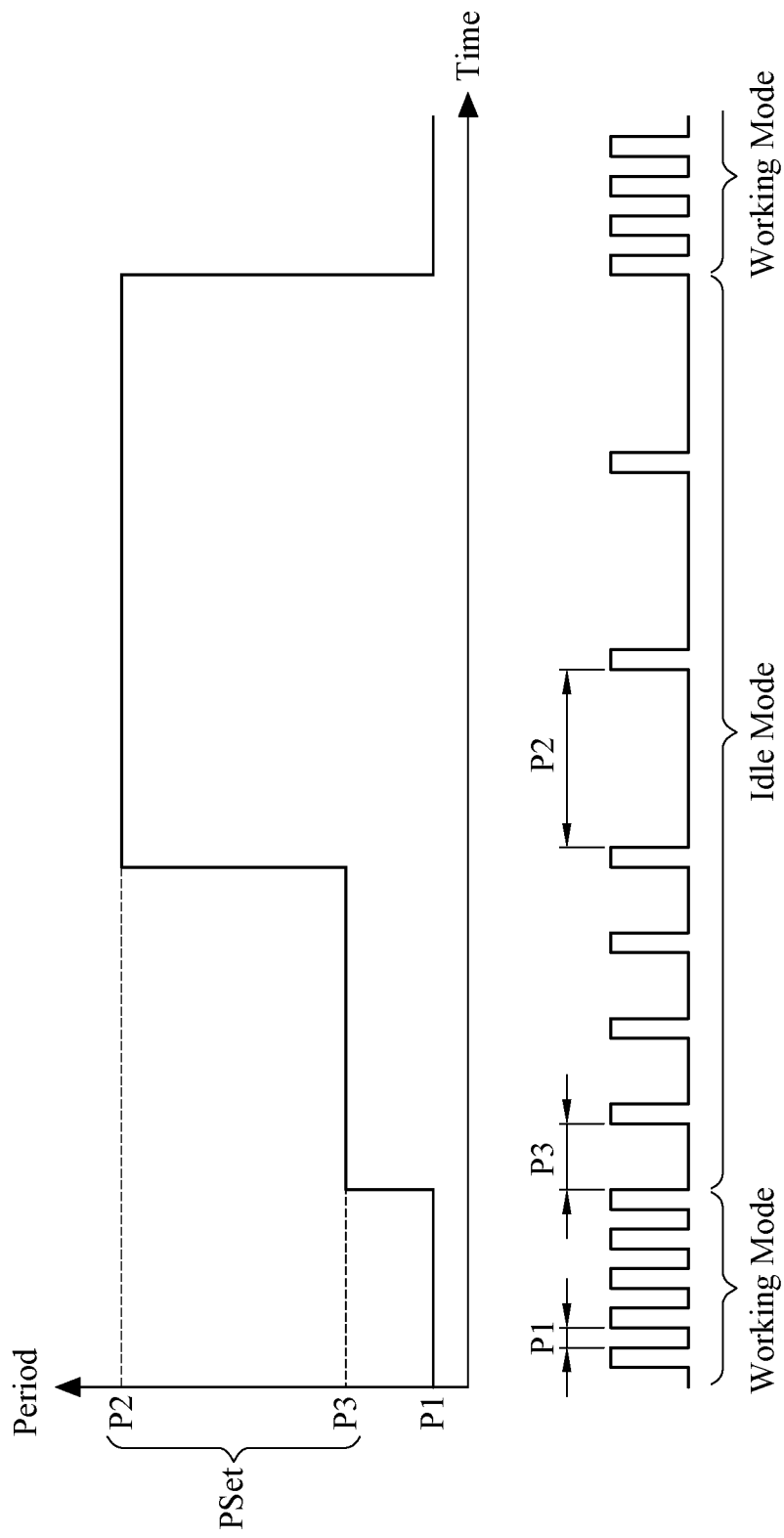
FIG. 2 is a schematic view according to another embodiment of the present disclosure.

Please refer to FIG. 2. In an embodiment of the present disclosure, the master controller 10 comprises a working mode and an idle mode. The master controller 10 sends the broadcast signal with a first period P1 when the master controller 10 is in the working mode. The master controller 10 sends the broadcast signal with a period selected from an idle period set PSet when the master controller 10 is in the idle mode. The idle period set at least comprises a second period P2, and the second period P2 is greater than the first period P1. In other words, the difference between the working mode and the idle mode is the period for sending the broadcast signals. Practically, the period length of the second period P2 should be set much greater than the period length of the first period P1. Under the premise of keeping sending the broadcast signal by the master controller 10, the master controller 10 decreases the frequency of sending the broadcast signal to save the electricity consumed in wireless communication performed by the antenna or the transceiver. It should be noticed that the "idle mode" described previously is not conventional "sleep mode". The main difference between the presented "idle mode" and the conventional "sleep mode" lies in that the idle mode does not turn off the antenna or the transceiver used for the communication by the master controller 10 while the conventional sleep mode turns off the antenna or the transceiver to break the communicable connection between the master controller and another device.

Please refer to FIG. 2. In another embodiment of the present disclosure, in addition to the second period P2, the idle period set PSet further comprises a third period P3 which is greater than the first period P1 and is smaller than the second period P2. When the master controller 10 switches to the idle mode, the master controller 10 sends the broadcast signal with the third period P3 first. After the duration time of a second time interval passed by, the master controller 10 sends the broadcast signal with second period P2. Practically, the idle period set PSet may have other periods in addition to the second period P2 and the third period P3 so that the period length for sending the broadcast signal may increase gradually along with the duration of idle mode. Accordingly, the control device of another embodiment of the present disclosure can save the power of unnecessary communicable connection by the design of the idle period set.

The trigger sensor 30 is an accelerometer (also regarded as G-sensor), an infrared transceiver, a gyroscope, a switch or a button. The trigger sensor 30 detects a trigger state and sends a trigger signal. For example, the trigger state can be one of the followings: the variation of the acceleration, the interruption of the infrared, the variation of the angular velocity, the switch-switching condition or the button-pushing condition. It should be noticed that the hardware of the trigger sensor 30 is not thus limited thereby.

The master controller 10 switches to the working mode when the master controller 10 receives the trigger signal. The master controller 10 switches to the idle mode selectively when the master controller 10 does not receive the trigger signal. Practically, the master controller 10 further comprises a timer configured for accumulating an idle time in which the master controller 10 does not receive the trigger signal. The master controller 10 switches to the idle mode when the idle time equals to a first time interval.

Regarding the way of accumulating the idle time, for example, the master controller 10 activates the timer after receiving the trigger signal, and keeps counting the idle time until receiving the next trigger signal, that is, resetting the timer when receiving the next trigger signal. Another example of accumulating the idle time is that the master controller 10 queries the trigger sensor 30 about the detected state and simultaneously activates the timer, and thereafter the master controller 10 periodically queries the trigger sensor 30 about the detected state. In other words, the master controller 10 retrieves the detected state actively by means of "polling". During the polling, the master controller 10 resets the timer if the trigger sensor 30 returns the trigger signal. On the contrary, the timer continues to accumulate the idle time if the trigger sensor does not return the trigger signal.

In the electronic gear-shifting system, a plurality of trigger sensors 30 can cooperate with the master controller 10 to implement various application scenarios such as automatically generating a trigger signal or generating a trigger signal passively. For example, the accelerometer or the infrared transceiver is installed in the front/rear derailleur as the trigger sensor 30, so the moving state or the falling state can be reported automatically and the master controller 10 can enter the working mode. On the other hand, there may be a switch or button installed as the trigger sensor 30 on the handlebar so that the speed change requirement from the rider can be fed back anytime.

Therefore, the installation position of the master controller 10 is not limited. For example, the master controller 10 is installed close to the front derailleur or the rear derailleur and the trigger sensor 30 such as an accelerometer is also installed close to the master controller 10. In another example, the master controller 10 is installed close to the shift-lever and the trigger sensor 30 such as the switch is also installed close to the master controller 10.

Figure 1B:
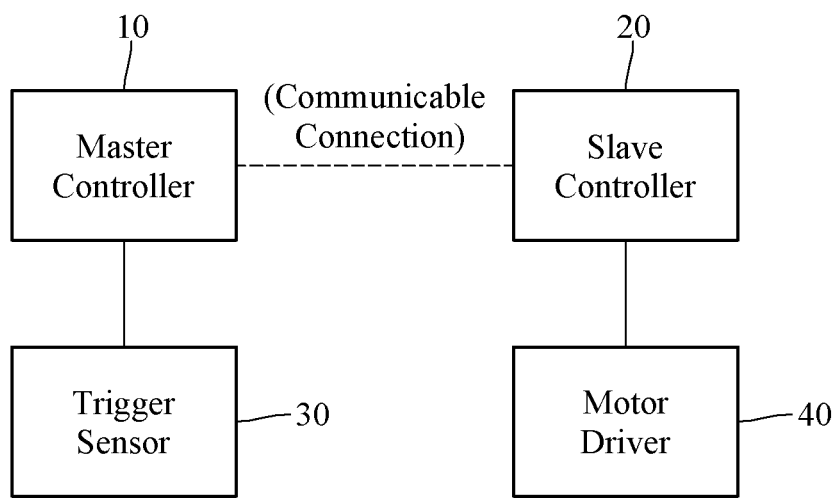
FIG. 1B is a schematic view according to another embodiment of the present disclosure.

Please refer to FIG. 1B. In another embodiment of the present disclosure, in addition to the master controller 10 and the trigger sensor 30, the control device with adjustable communication period further comprises a slave controller 20. The master controller 10 and the trigger sensor 30 such as the switch are installed close to each other on the handlebar, and the master controller 10 electronically connects to the trigger sensor 30. The slave controller 20 is installed close to the front derailleur or the rear derailleur of the electronic gear-shifting system of the bicycle. The slave controller 20 has a communicable connection with the master controller 10 and electronically connects to the motor driver 40. Practically, each of the front derailleur and the rear derailleur has a slave controller 20 and a motor driver 40, and FIG. 1B only shows one slave controller 20 as an illustrative example. When the slave controller 20 receives the broadcast signal from the master controller 10, the slave controller 20 selectively adjusts the motor driver 40 of the bicycle according to the broadcast signal. Specifically, the master controller 10 in the working mode sends the broadcast signal including the speed change command through the antenna or the transceiver (not depicted), and the slave controller 20 located at the front derailleur or the rear derailleur receives this broadcast signal and accordingly adjusts the motor driver 40.

Figure 1C:
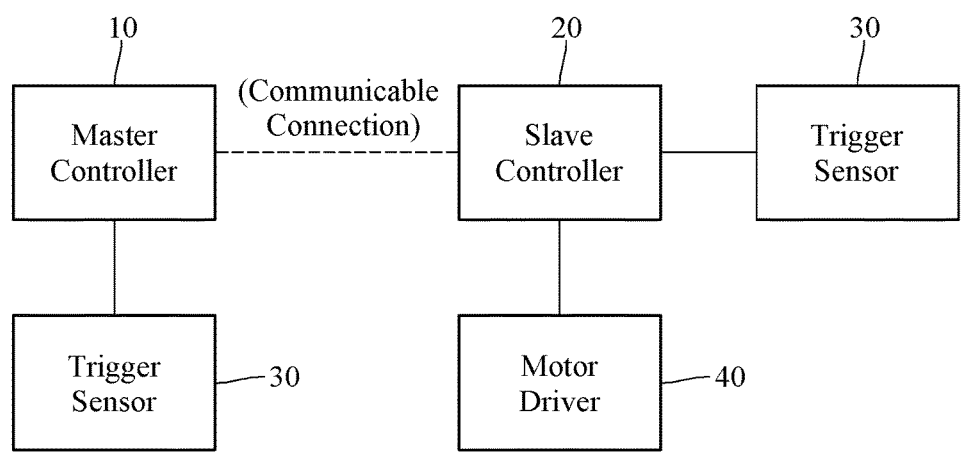
FIG. 1C is a schematic view according to the other embodiment of the present disclosure.

In another embodiment of the present disclosure, the slave controller 10 passively receives the broadcast signal of the master controller 10. Please refer to FIG. 1C. In further another embodiment of the present disclosure, the slave controller 20 comprises the working mode and the idle mode the same as what the master controller 10 has, and each of the slave controller 20 and the master controller 10 electronically connects to a trigger sensor 30.

The slave controller 20 sends the broadcast signal with a fourth period when the slave controller 20 is in the working mode. The slave controller 20 sends the broadcast signal with a period selected from an idle period set PSet when the slave controller 20 is in the idle mode. The idle period set at least comprises a fifth period, and the fifth period is greater than the fourth period. The trigger sensor 30 electronically connects to the slave controller 20, the slave controller 20 switches to the working mode when the slave controller 20 receives the trigger signal, and the slave controller 20 switches to the idle mode selectively when the slave controller 20 does not receive the trigger signal.

The fourth period and the fifth period are similar to the first period P1 and the second period P2 respectively. The settings of period lengths in the slave controller 20 can follow those of the master controller 10. Alternatively, said settings of the period lengths in the slave controller 20 can be different from those of the master controller 10, and are not limited to the present disclosure. The slave controller 20 establishes a communicable connection with the master controller 10 when the slave controller 20 in the working mode receives the broadcast signal from the master controller 10. Similarly, the master controller 10 establishes a communicable connection with the slave controller 20 when the master controller 10 in the working mode receives the broadcast signal from the slave controller 20. Practically, the master controller 10 and the slave controller 20 are not necessary to switches to the working mode simultaneously. However, the master controller 10 can directly ask the slave controller to switch to the working mode through the broadcast signal, and it is not limited to the present disclosure.

In short, the slave controller 20 functions just like the master controller 10. For example, the slave controller 20 switches to the working mode according to the trigger signal sent by the triggering sensor 30 electrically connected to the slave controller 20. Similarly, the slave controller 20 has a timer to accumulate the idle time, and switches to the idle mode when the accumulated idle time equals to the first time interval.

To summary the embodiments of the above descriptions about the slave controller 20, the slave controller 20 can be viewed as an extension component of the master controller 10 so that the slave controller 20 adjusts the motor driver 40 according to the broadcast signal sent by the master controller 10. Alternatively, the slave controller 20 can also be regarded as the master controller 10 installed in another position of the bicycle. The adjustment of the modes of the slave controller 20 can be active or passive. Active adjustment means that the slave controller 20 switches to the working mode when the slave controller 20 receives the trigger signal sent by the trigger sensor 30, while the slave controller 20 switches to the idle mode selectively when the slave controller 20 does not receive the trigger signal. Passive adjustment means the slave controller 20 switches to the working mode according to the broadcast signal sent by the master controller 10.

In the idle mode, the master controller 10 (or the slave controller 20) attaches the electricity information of the master controller 10 (or the slave controller 20) or the gear information of the motor driver 40 to the broadcast signal and sends the broadcast signal with the beacon format. Any mobile communication device with the BLE (Bluetooth Low Energy) technology such as a smartphone can receive the broadcast signal after turning on the Bluetooth function and can show the electricity/gear information in a graphic form or in a text form for user's reference. Accordingly, the status of the electronic gear-shifting can be utilized when the master controller 10 (or the slave controller 20) is in the idle mode.

When both the master controller 10 and the slave controller 20 are in the working mode, the master controller 10 can establish a connection with the slave controller 20 through the broadcast signal. The "connection" means that the slave controller 20 sends the response after receiving the broadcast signal. On the other hand, the slave controller 20 also can send the broadcast signal actively and the master controller 10 sends the response to the slave controller 20 for establishing the connection.

In general, when a rider begins to ride a bicycle, the master controller 10 and the slave controller 20 of the electronic gear-shifting system should be switched to the working mode immediately, so the motor driver 40 can react to the gear-shifting requirement at once. As a result, when the trigger sensor 30 detects any trigger state such as bicycle movement, the controller (such as the master controller 10) in the idle mode should switch to the working mode immediately as soon as it receives the trigger signal. Practically, the controller in working mode also can send the broadcast signal to inform another controller (such as the slave controller 20) to return to the working mode from the idle mode instantly.

In another embodiment of the present disclosure, in addition to above operation that the master controller 10 can decide whether to switch to the idle mode according to the idle time, the master controller 10 also can be forced to switch to the idle mode by the disconnection signal generated by the switch located at the handlebar.

Figure 3:
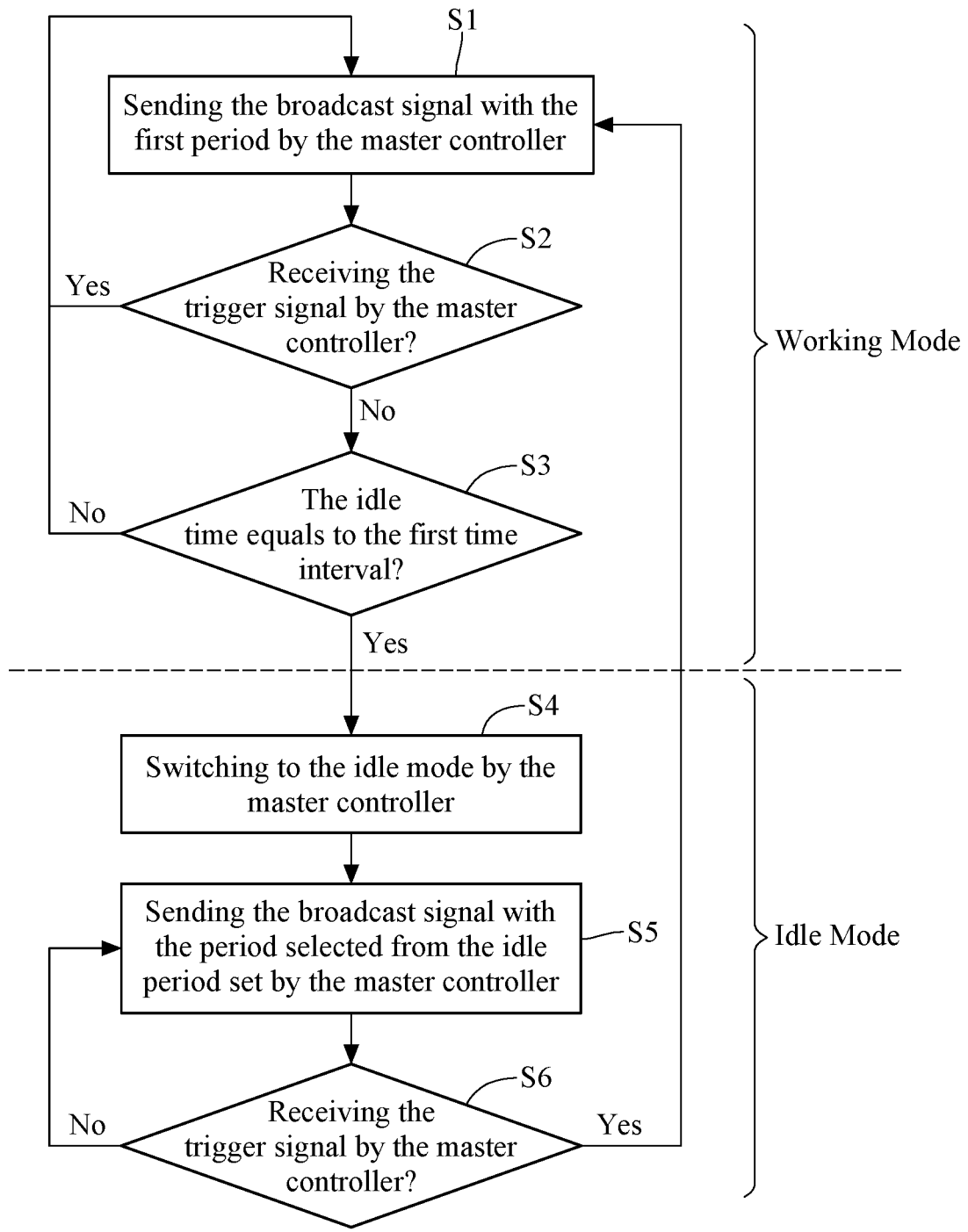
FIG. 3 is a flowchart of adjustment of the working mode and the idle mode according to an embodiment of the present disclosure.

Please refer to FIG. 3, which is a flowchart illustrating the method for adjusting communication period in another embodiment of the present disclosure. Said method is explained in the following, starting from a master controller 10 in the working mode as shown in step S1. The master controller 10 sends the broadcast signal with the first period P1 and concurrently activates the timer to accumulate the idle time. Please refer to step S2. If the master controller 10 receives a trigger signal during the period of sending the broadcast signals, the master controller 10 returns to step S1 and resets the timer. Referring step S3, before the idle time equals to the first time interval, the master controller 10 keeps sending the broadcast signals with the first period and then goes back to step S1. The master controller 10 switches to the idle mode when the idle time accumulated by the timer equals to the first time interval. Please refer to step S5, wherein the master controller 10 in the idle mode sends broadcast signals with a period selected from the idle period set PSet. In the duration of sending the broadcast signal with the idle period set PSet, the master controller 10 switches to the working mode if the master controller 10 receives the trigger signal from the trigger sensor 30; otherwise, the master controller 10 keeps sending broadcast signals with the period selected from the idle period set PSet. The period length defined in the idle period set PSet is greater than the first period. Therefore, when the master controller 10 is in the idle mode, the frequency of sending the broadcast signal and the power consumption decrease when the master controller 10 works in the idle mode.

In summary, the control device with an adjustable communication period and the method using said control device can send the broadcast signals with a shorter period when the controller is in the working mode, or send the broadcast signal with a longer period when the controller is in the idle mode. Moreover, the slave controller in the idle mode can send power information of its own or gear information of the motor driver, not only saving power for unnecessary communicable connection but also keeping immediate information sharing among the controllers.

What is claimed is:

1. A control device with adjustable communication period for an electromechanical gear shifter of a bicycle, comprising:
   a master controller comprising a working mode and an idle mode, wherein the master controller sends a broadcast signal with a first period when the master controller is in the working mode, and the master controller sends the broadcast signal with a period selected from an idle period set and greater than the first period when the master controller is in the idle mode, wherein the idle period set comprises a second period at least and the second period is greater than the first period; and
   a trigger sensor electronically connecting to the master controller, wherein the trigger sensor detects a trigger state and sends a trigger signal;
   wherein the master controller switches to the working mode when the master controller receives the trigger signal, and the master controller selectively switches to the idle mode when the master controller does not receive the trigger signal.

2. The control device with adjustable communication period according to claim 1, wherein the master controller is adapted to be installed close to the electromechanical gear shifter and the master controller is adapted to selectively control a motor driver according to the broadcast signal.

3. The control device with adjustable communication period according to claim 1, wherein the master controller is adapted to be installed close to a handlebar of the bicycle, further comprising a slave controller in communicable connection with the master controller, the slave controller is adapted to be installed close to the electromechanical gear shifter and the slave controller is adapted to selectively control a motor driver according to the broadcast signal.

4. The control device with adjustable communication period according to claim 3, wherein the slave controller comprises a working mode and an idle mode, the slave controller sends a broadcast signal with a fourth period when the slave controller is in the working mode, and the slave controller sends the broadcast signal with a period selected from an idle period set when the slave controller is in the idle mode, wherein the idle period set comprises a fifth period at least and the fifth period is greater than the fourth period; and the trigger sensor electronically connects to the slave controller, wherein the slave controller switches to the working mode when the slave controller receives the trigger signal, and the slave controller selectively switches to the idle mode when the slave controller does not receive the trigger signal.

5. The control device with adjustable communication period according to claim 3, wherein the slave controller comprises the working mode and the idle mode that are as same as those of the master controller, the slave controller switches to the working mode or the idle mode selectively when the slave controller receives the broadcast signal.

6. The control device with adjustable communication period according to claim 1, wherein the master controller further comprises a timer configured for accumulating an idle time when the master controller does not receive the trigger signal.

7. The control device with adjustable communication period according to claim 6, wherein the master controller switches to the idle mode when the idle time equals to a first time interval.

8. The control device with adjustable communication period according to claim 4, wherein the slave controller further comprises a timer configured for accumulating an idle time when the slave controller does not receive the trigger signal.

9. The control device with adjustable communication period according to claim 8, wherein the slave controller switches to the idle mode when the idle time equals to a first time interval.

10. The control device with adjustable communication period according to claim 1, wherein the trigger sensor is an accelerometer, an infrared transceiver, a gyroscope, a switch or a button.

11. The control device with adjustable communication period according to claim 1, wherein the idle period set further comprises a third period, the third period is smaller than the second period and greater than the first period, the master controller sends the broadcast signal with the third period for a second time interval before the master controller sends the broadcast signal with the second period of the idle period set once the master controller switches to the idle mode.

12. The control device with adjustable communication period according to claim 3, wherein the broadcast signal comprises an electricity information of the slave controller or a gear information of a motor driver.

13. The control device with adjustable communication period according to claim 3, wherein the master controller establishes a communicable connection to the slave controller when the master controller is in the working mode and the master controller receives a broadcast signal from the slave controller.

14. The control device with adjustable communication period according to claim 3, wherein the slave controller establishes a communicable connection to the master controller when the slave controller is in the working mode and the slave controller receives a broadcast signal from the master controller.

15. A method for adjusting the communication period configured for the control device of claim 1 comprising:
    sending the broadcast signal with the first period when the master controller is in the working mode;
    keeping in the working mode when the master controller receives the trigger signal after sending the broadcast signal, and switching to the idle mode selectively when the master controller does not receive the trigger signal;
    sending the broadcast signal with the period selected from the idle period set by the master controller, wherein the idle period set comprises a second period at least and the second period is greater than the first period; and
    receiving the trigger signal and switching to the working mode by the master controller when the master controller is in the idle mode.

16. The method for adjusting the communication period according to claim 15, wherein the idle period set further comprises a third period, and the master controller sends the broadcast signal with the third period before the master controller sends the broadcast signal with the second period when sending the broadcast signal with the period selected from the idle period set, wherein the third period is smaller than the second period and the third period is greater than the first period.

17. The method for adjusting the communication period according to claim 15, wherein when the master controller is in the working mode and is sending the broadcast signal with the first period, the master controller calculates an idle time with a timer, wherein the timer accumulates the time in which the master controller does not receive the trigger signal as the idle time, and wherein the master controller switches to the idle mode when the idle time equals to a first time interval.

18. The method for adjusting the communication period according to claim 15, wherein the broadcast signal comprises an electricity information of the master controller or a gear information of a motor driver, a mobile communication device receives the broadcast signal and shows the electricity information or the gear information in a figure form or in a text form when the master controller is in the idle mode.

* * * * *